United States Patent
Lemmon et al.

(10) Patent No.: US 7,029,517 B2
(45) Date of Patent: Apr. 18, 2006

(54) DEVICES AND METHODS FOR HYDROGEN STORAGE AND GENERATION

(75) Inventors: John Patrick Lemmon, Schoharie, NY (US); Luke Nathaniel Brewer, Rexford, NY (US); Job Thomas Rijssenbeek, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 221 days.

(21) Appl. No.: 10/702,955

(22) Filed: Nov. 6, 2003

(65) Prior Publication Data

US 2005/0098035 A1    May 12, 2005

(51) Int. Cl.
*B01D 53/04*    (2006.01)
*B01D 53/26*    (2006.01)

(52) U.S. Cl. .......................... 95/116; 95/148; 96/132; 96/143; 96/154; 423/648.1

(58) Field of Classification Search ............... 95/95, 95/99, 106, 114–117, 148; 96/108, 132, 96/143, 146, 154, 144; 423/648.1, 658.2
See application file for complete search history.

(56) References Cited

U.S. PATENT DOCUMENTS

| 3,414,605 | A |   | 12/1968 | Walker |
|---|---|---|---|---|
| 4,397,834 | A |   | 8/1983 | Mendelsohn et al. |
| 4,435,374 | A | * | 3/1984 | Helm, Jr. .................. 423/418.2 |
| 4,613,362 | A |   | 9/1986 | Welter et al. |
| 4,716,736 | A |   | 1/1988 | Schwarz |
| 4,737,164 | A | * | 4/1988 | Sarkkinen ........................ 95/68 |
| 5,209,902 | A | * | 5/1993 | Matthews et al. ............. 422/21 |
| 5,282,886 | A | * | 2/1994 | Kobayashi et al. ........... 95/131 |
| 5,505,825 | A | * | 4/1996 | Gold et al. .................... 95/126 |
| 5,882,623 | A |   | 3/1999 | Zaluska et al. .......... 423/648.1 |
| 5,895,519 | A | * | 4/1999 | Lorimer ........................... 95/56 |
| 6,022,399 | A | * | 2/2000 | Ertl et al. ...................... 95/114 |
| 6,080,381 | A |   | 6/2000 | Zaluska et al. .......... 423/648.1 |
| 6,290,753 | B1 | * | 9/2001 | Maeland et al. ............... 95/116 |
| 6,306,198 | B1 | * | 10/2001 | Corbin ......................... 95/103 |
| 6,500,238 | B1 | * | 12/2002 | Brandes et al. ................ 95/148 |
| 6,562,113 | B1 | * | 5/2003 | Aykanian et al. ............... 96/143 |
| 2002/0045076 | A1 | * | 4/2002 | Dieckmann et al. ........... 429/17 |
| 2002/0169068 | A1 | * | 11/2002 | Dai et al. ...................... 502/38 |
| 2003/0026757 | A1 |   | 2/2003 | Pecharsky et al. ........ 423/658.2 |
| 2003/0113252 | A1 |   | 6/2003 | Chen et al. |
| 2003/0209147 | A1 | * | 11/2003 | Myasnikov et al. .......... 96/146 |
| 2003/0209148 | A1 | * | 11/2003 | Myasnikov et al. .......... 96/146 |

(Continued)

FOREIGN PATENT DOCUMENTS

DE    3535378    4/1987

(Continued)

OTHER PUBLICATIONS

Ji-Cheng Zhao et al., "A Diffusion Multiple Approach for the Accelerated Design of Structural Materials", MRS Bulletin, pp. 324-329, Apr. 2002—XP009034368.

(Continued)

*Primary Examiner*—Robert H. Spitzer
(74) *Attorney, Agent, or Firm*—Paul J. DiConza; William E. Powell, III

(57) ABSTRACT

Disclosed herein is a method for the storage of hydrogen comprising contacting a hydrogen storage composition with a gaseous mixture comprising hydrogen; and irradiating the hydrogen storage composition with radio frequency radiation or microwave radiation in an amount effective to facilitate the absorption, adsorption and/or chemisorption of hydrogen into the hydrogen storage composition.

34 Claims, 1 Drawing Sheet

U.S. PATENT DOCUMENTS

| | | | |
|---|---|---|---|
| 2003/0209149 A1* | 11/2003 | Myasnikov et al. | 96/146 |
| 2004/0031387 A1* | 2/2004 | Jhi et al. | 95/90 |
| 2004/0031390 A1* | 2/2004 | Myasnikov et al. | 96/146 |

FOREIGN PATENT DOCUMENTS

| | | |
|---|---|---|
| EP | 0 355 207 | 2/1990 |
| EP | 0 360 203 | 3/1990 |
| JP | 06 013077 | 1/1994 |
| JP | 10 008180 | 1/1998 |
| WO | WO 01/68515 | 9/2001 |
| WO | WO 03/050447 | 6/2003 |
| WO | WO 03/05848 | 7/2003 |
| WO | WO 03/061818 | 7/2003 |

OTHER PUBLICATIONS

J.C. Zhao et al., "Alloying and Phase Stability in Niobium Silicide In-Situ Composites", TMS (The Minerals, Metals & Materials Society), Structural Intermetallics, 9 pages, 2001—XP009034288.

Tatsuhiko et al., "Solid-State Synthesis of $Mg_2Si$ via Bulk Mechanical Alloying", Materials Science Forum, vol. 350-351, pp. 333-338, 2000—XP008047618.

Maximilian Fichtner et al., "Magnesium Alanate—A Material for Reversible Hydrogen Storage!", Elsevier, Journal of Alloys and Compounds, vol. 356-357, pp. 418-422, 2003.

J. Z. Luo et al., "Hydrogen Absorption Over Li—Carbon Complexes", Mat. Res. Soc. Symp. Proc., vol. 730, pp. V2.6.1-V2.6.6, 2002—XP008047611.

International Search Report.

* cited by examiner

DEVICES AND METHODS FOR HYDROGEN STORAGE AND GENERATION

BACKGROUND

This disclosure relates to devices and methods for hydrogen storage and recovery.

Hydrogen is a "clean fuel" because it can be reacted with oxygen in hydrogen-consuming devices, such as a fuel cell or a combustion engine, to produce energy and water. Virtually no other reaction byproducts are produced in the exhaust. As a result, the use of hydrogen as a fuel effectively solves many environmental problems associated with the use of fossil-fuels. Safe and efficient storage of hydrogen gas is, therefore, an important feature for many applications that can use hydrogen. In particular, minimizing volume and weight of the hydrogen storage systems are important factors in mobile applications.

Several methods of storing hydrogen are currently used but these are either inadequate or impractical for widespread consumer applications. For example, hydrogen can be stored in liquid form at very low temperatures. Cryogenic storage, however, provides a low volume density of hydrogen storage per liter, and is insufficient for consumer applications. In addition, the energy consumed in liquefying hydrogen gas is about 30% of the energy available from the resulting hydrogen. Finally, liquid hydrogen is neither safe nor practical for most consumer applications.

An alternative is to store hydrogen under high pressure in cylinders. However, a 45 kilogram steel cylinder can only store about one pound of hydrogen at about 154 kilogram/square centimeter ($kg/cm^2$), which translates into 1% by weight of hydrogen storage. More expensive composite cylinders with special compressors can store hydrogen at higher pressures of about 316 $kg/cm^2$ to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

In view of the above, there is a need for safer, more effective and efficient methods of storing and recovering hydrogen. In addition, there is a desire to minimize the overall system volume and weight.

BRIEF DESCRIPTION

Disclosed herein is a method for the storage of hydrogen comprising contacting a hydrogen storage composition with a gaseous mixture comprising hydrogen; and irradiating the hydrogen storage composition with radio frequency radiation or microwave radiation in an amount effective to facilitate the absorption, adsorption and/or chemisorption of hydrogen into the hydrogen storage composition.

Disclosed herein too is a method for the storage and recovery of hydrogen comprising contacting a hydrogen storage composition with a first gaseous mixture comprising a first concentration of hydrogen; irradiating the hydrogen storage composition with a radio frequency radiation or microwave radiation having a first frequency in an amount effective to facilitate the absorption, adsorption and/or chemisorption of hydrogen into the hydrogen storage composition; contacting the hydrogen storage composition with a second gaseous mixture comprising a second concentration of hydrogen; and irradiating the hydrogen storage composition with a radio frequency radiation or microwave radiation having a second frequency in an amount effective to facilitate the desorption of hydrogen from the hydrogen storage composition.

Disclosed herein too is a system for the storage and recovery of hydrogen comprising a hydrogen generation reactor, wherein the hydrogen generation reactor utilizes radio frequency radiation and/or microwave frequency radiation to recover hydrogen.

Disclosed herein too is an energy storage device that utilizes the aforementioned methods of hydrogen storage.

DESCRIPTION OF THE DRAWINGS

The FIGURE is a schematic showing a system for the absorption and desorption (recovery) of hydrogen from a hydrogen storage composition using radio frequency waves and microwaves.

DETAILED DESCRIPTION OF PREFERRED EMBODIMENTS

Figure 1:
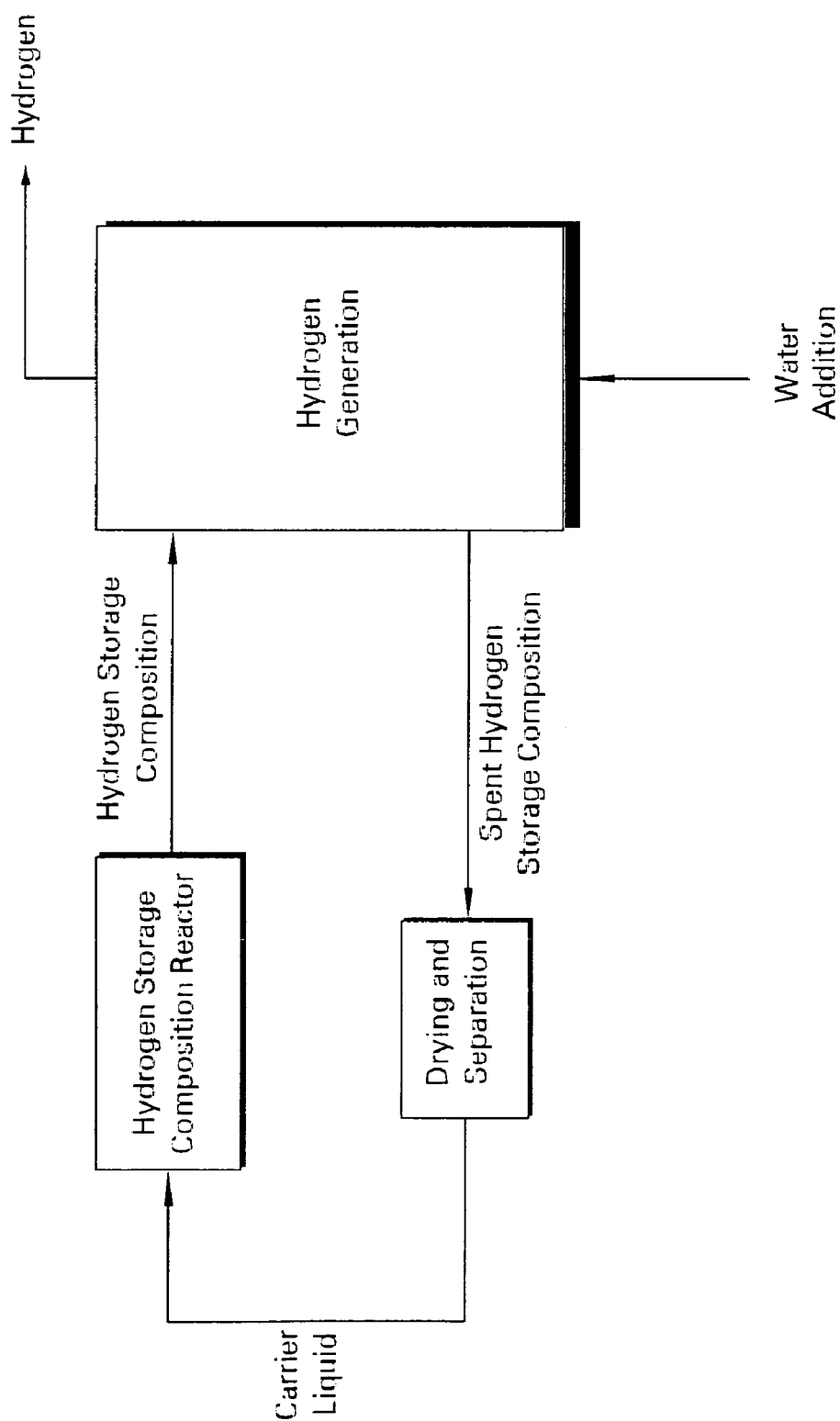

Disclosed herein is a method for storing hydrogen that comprises using electromagnetic radiation in the radio wave frequency (radio frequency) and the microwave frequency region. The method may advantageously be used to facilitate the storage of hydrogen in hydrogen storage compositions such as carbon, aluminides, carbides, suicides, nitrides, borides, oxides, oxynitrides, hydroxides, silicates, aluminosilicates, or the like, or a combination comprising at least one of the foregoing. The use of electromagnetic energy may also advantageously enhance the amount of hydrogen stored in the hydrogen storage compositions. The hydrogen storage compositions may be used for the recovery of hydrogen in energy generating devices such as fuel cells, gas turbines, or the like.

Hydrogen is generally stored via hydrogenation of hydrogen storage compositions. Hydrogen storage may occur via protonic storage, hydride ion storage, or molecular storage. In general, hydrogen storage compositions can comprise carbon, aluminides, borides, carbides, nitrides, suicides, oxides, oxynitrides, hydroxides, silicates, aluminosilicates, or the like, or a combination comprising at least one of the foregoing. Hydrogen storage compositions release heat while they absorb, adsorb or chemisorb hydrogen. This results in the storage of hydrogen. The process of adsorption, absorption or chemisorption will hereinafter be referred to as the process for the storage of hydrogen.

The absorbed hydrogen may then be released or desorbed by reducing the pressure and supplying heat to the hydrogen storage compositions. The process of desorption may be used for the recovery of hydrogen. The recovered hydrogen may then be supplied to processes where the hydrogen may be utilized, such as in fuel cells. The process of desorption will hereinafter be referred to as the process for the recovery of hydrogen.

In one exemplary embodiment, the hydrogen storage compositions from which hydrogen can be obtained generally consist of a HM complex, where M is a metal and H is hydrogen. Such hydrogen storage compositions may have ionic, covalent, metallic bonding or bonding comprising a combination of at least one of the foregoing types of bonding. These hydrogen storage compositions preferably have a hydrogen to metal ratio of greater than or equal to about 1. The interaction between a metal and hydrogen is generally a reversible reaction and takes place according to the following equation (I):

$$M + (x/2)H_2 \longleftrightarrow MHx. \qquad (I)$$

Hydrogen storage compositions generally store about 2 to about 7 weight percent (wt %) of hydrogen by weight, and have high volumetric storage densities. The storage density of hydrogen in the hydrogen storage compositions is greater than either liquid or solid hydrogen, which makes them very useful in energy generation applications. A suitable example of an MH complex that can store and release hydrogen is magnesium hydride. Other suitable examples that may be used for the recovery of hydrogen are alanates. Light metal alanates such as those obtained from alkali metals and alkaline earth metals are preferred for the recovery of hydrogen. Lithium alanate (LiAlH$_6$), sodium alanate (NaAlH$_6$) and magnesium alanate (MgAlH$_6$) are especially preferred for the recovery of hydrogen. Other alanates such as titanium alanates may also be used for hydrogen recovery.

In another exemplary embodiment, the carbon present in the hydrogen storage composition may be present in the form of nanotubes. The nanotubes may be single wall carbon nanotubes (SWNTs), multiwall carbon nanotubes (MWNTs), or vapor grown carbon fibers (VGCF). The hydrogen storage composition may also comprise a combination comprising at least one of the foregoing nanotubes.

As stated above, radio frequencies and microwave frequencies are preferred for facilitating the storage as well as the recovery of hydrogen from the hydrogen storage compositions. The coupling of the radiation with the dipoles present in the hydrogen storage composition is used to facilitate the storage and recovery of hydrogen. In one embodiment, the frequency of the microwave and the radio wave radiation may be varied in order to effect an efficient coupling between the radiation and the dipoles of the hydrogen storage composition. Such a coupling may effectively promote the storage and/or the release of hydrogen. In another embodiment, the frequency of the microwave and the radio wave radiation may be varied with the temperature of the hydrogen storage composition in order to effectively promote the storage and/or the release of hydrogen.

In one embodiment when the hydrogen storage composition is placed in an electromagnetic field, the power absorbed by the composition is shown in Formula (I) below:

$$P = \omega \in_o \in''_r E^2 \qquad (I)$$

where P is the power absorbed per unit volume, $\omega = 2\pi f$, where f is the applied frequency, $\in_o$ is the permittivity of free space, $\in''_r$ is the dielectric loss factor of the material and E is the local applied electric field. From the equation (I) it may be seen that the power absorbed is directly dependent upon the dielectric loss factor. The dielectric loss factor is dependent upon a number of factors, such as the dipole moment of various components present in the hydrogen storage composition, the temperature and the frequency of the radiation, amongst other factors.

In one embodiment, pertaining to the use of equation (I), the dielectric loss factor in the hydrogen storage composition may be adjusted or optimized as desired to facilitate either the storage and/or release of hydrogen in the hydrogen storage composition. In another embodiment, while a first frequency (in either the microwave or radio wave range) in a first environment, may be used to facilitate the storage of hydrogen in the hydrogen storage composition, a second frequency in a second (or the first) environment, may be used to facilitate the recovery of hydrogen. The environment as defined herein refers to the hydrogen storage composition as well as any agents contained in the composition that facilitate the storage and/or recovery of hydrogen when the hydrogen storage composition is coupled with radio frequency radiation and/or electromagnetic radiation. Examples of such agents are materials having dipoles that can be heated when subjected to a radio frequency radiation and/or microwave radiation. Suitable examples of such materials are water, alcohols, dimethylformamide, acetone, carbon, silicon carbide, or the like, or combinations comprising at least one of the foregoing agents.

In general, when radio waves are utilized to effect the storage and/or desorption of hydrogen by the hydrogen storage composition, excellent uniformity and remarkable speed in absorption and/or desorption is possible. When microwaves are used, however, mechanical agitation may be utilized to facilitate uniform absorption and desorption of hydrogen by the hydrogen storage composition. Non-uniform heating by microwaves may give rise to thermal runaway, which may result in an undesirable sintering of the hydrogen storage composition. Different frequencies within the electromagnetic spectrum may be utilized either simultaneously or sequentially to facilitate the storage and recovery of hydrogen in the hydrogen storage compositions. In one embodiment, in order to store hydrogen, it may be desirable to contact the hydrogen storage composition with a gaseous mixture containing hydrogen. In another embodiment, pertaining to the storage of hydrogen, the storage of hydrogen may occur by the exposure of the hydrogen storage composition to hydrogen that is just formed. For example, the hydrogen storage compositions may first be irradiated with radio frequency waves for a given time period, followed by irradiation at microwave frequencies during either the hydrogen storage or recovery process. Alternatively, it may be desirable to subject the hydrogen storage composition to both radio frequencies as well as microwave frequencies simultaneously during the storage and/or recovery of hydrogen. It is also envisioned that several different frequencies within the radio frequency range or within the microwave frequency range or both ranges may be sequentially or simultaneously utilized to facilitate the storage and recovery of hydrogen in the hydrogen storage composition.

In one embodiment, a method for the storage and recovery of hydrogen comprises contacting a hydrogen storage composition in a first gaseous mixture comprising hydrogen; irradiating the hydrogen storage composition with radio frequency radiation or microwave radiation having a first frequency, and wherein the irradiating is in an amount effective to facilitate the absorption, adsorption or chemisorption of hydrogen into the hydrogen storage composition; contacting the hydrogen storage composition with a second gaseous mixture comprising a second concentration of hydrogen; and irradiating the hydrogen storage composition with radio frequency radiation or microwave radiation having a second frequency, and wherein the irradiating is in an amount effective to facilitate the desorption of hydrogen from the hydrogen storage composition.

In one embodiment, the first frequency is not equal to the second frequency, but is either greater than or less than the second frequency. In one embodiment, the radio frequencies may be used to facilitate the storage of hydrogen from the hydrogen storage composition, while the microwave frequencies may be used to facilitate the recovery of hydrogen from the hydrogen storage composition. In another embodiment, microwave frequencies may be used to facilitate the storage of hydrogen from the hydrogen storage composition, while the radio frequencies may be used to facilitate the recovery of hydrogen from the hydrogen storage composition. In another embodiment, the first frequency is equal to the second frequency.

In yet another embodiment, the first concentration of hydrogen in which the hydrogen storage composition is immersed is greater than the second concentration of hydrogen in which the hydrogen storage composition is immersed. In an exemplary embodiment, the process of contacting the hydrogen storage composition with an environment comprising a second concentration of hydrogen may involve physical movement of the hydrogen storage composition from a first location where the hydrogen storage occurs to a second location where the hydrogen recovery occurs. In another embodiment, the first location may be the same as the second location. In an exemplary embodiment, the first location may be a hydrogen storage composition generation reactor as shown in the figure, while the second location may be a hydrogen generation reactor. As noted above, the hydrogen to be stored in the hydrogen storage composition may be present in a gaseous mixture comprising hydrogen or it may be formed and directly stored in the hydrogen storage composition without being mixed with other gases.

Energy generators for emitting electromagnetic radiation may be both continuous wave or pulsed wave generators and either of these types of generators may be utilized in the hydrogen storage and hydrogen generating process.

In one embodiment, combined sources of electromagnetic radiation may be utilized to facilitate the absorption and desorption of hydrogen. These sources may be from within the microwave and/or radio wave range or they may be from outside the aforementioned ranges as desired. In one exemplary embodiment, in addition to microwave and radio frequency radiation, other forms of electromagnetic energy such as infra-red radiation, ultraviolet radiation, X-ray radiation may also be used if desired.

In addition to utilizing combined sources of electromagnetic radiation (i.e., radio waves and microwaves) to facilitate the storage and recovery of hydrogen in the hydrogen storage composition, it may be desirable to supplement the energy derived from electromagnetic radiation with heating derived from other forms of thermal energy such as gas fired or electrically heated ovens or furnaces. In one embodiment, the hydrogen storage composition may be heated using convectional and/or conductive heating in conjunction with energy derived from radio frequency or microwave radiation. In such instances, while other forms of heating can be used to heat the hydrogen storage composition to any preset desired temperature, additional increases in temperature can be obtained via coupling with microwave and radio wave radiation. When conventional heating by means such as convection is alone utilized, a temperature gradient usually exists in the heated material, wherein the outer surface or skin temperature is greater than the internal or core temperature. This effect is commonly termed a 'skin-core' effect and gives rise to chemical or physical gradients within the hydrogen storage composition. Thus a combination of heating by convection or conduction as well as microwave and/or radio frequency heating can be advantageously used to enhance temperature uniformity, thereby reducing chemical concentration gradients or physical property gradients within the hydrogen storage composition.

In general, radio frequencies of about 10 kilohertz (kHz) to about 300 megahertz (MHz) are preferred to facilitate the storage and recovery of hydrogen. Within this range, a frequency of greater than or equal to about 1 MHz, preferably greater than or equal to about 10 MHz, and more preferably greater than or equal to about 50 MHz may be effectively used. Within this range, radio frequencies of less than or equal to about 250 MHz, preferably less than or equal to about 225 MHz may also be effectively used.

Microwave frequencies of about 300 MHz to about 300 gigahertz (GHz) may also effectively be used to facilitate the storage and recovery of hydrogen. Within this range frequencies of greater than or equal to about 400 MHz, preferably greater than or equal to about 600 MHz, and more preferably greater than or equal to about 750 MHz may be advantageously used. Also usable within this range are frequencies of less than or equal to about 280 GHz, preferably less than or equal to about 260, and more preferably less than or equal to about 250 GHz. The frequencies of both the microwave radiation and the radio frequency radiation may be tuned to facilitate the absorption, adsorption, chemisorption or desorption of the hydrogen.

In general, the electromagnetic energy delivered to the hydrogen storage composition is generally sufficient to bring about the storage without any sintering. This energy may be about 0.001 watts/gram to about 1,000 watts/gram of the hydrogen storage composition. Within this range, it is generally desirable to have an electromagnetic energy input of greater than or equal to about 1 watt/gram, preferably greater than or equal to about 10 watts/gram of the hydrogen storage composition. It is also desirable within this range to have an electromagnetic energy input less than or equal to about 500 watts/gram, preferably less than or equal to about 200 watts/gram of the hydrogen storage composition. The frequencies may be tuned to facilitate the absorption, adsorption, chemisorption or desorption of the hydrogen. The hydrogen storage compositions may comprise carbon, aluminides, alanates, carbides, borides, nitrides, borocarbides, boronitrides, suicides, borosilicides, carbosilicides, oxides, oxynitrides, hydroxides, silicates, aluminosilicates or nitrosilicides. The hydrogen storage compositions may be in the form of porous materials such as aerogels, zeolites, porous metal oxides, and the like.

In one embodiment, during the storage of hydrogen into the hydrogen storage composition, the radio frequency or microwave energy may be introduced into the applicator or waveguide after the hydrogen storage composition is located in a desired position in the applicator. The hydrogen gas may then be introduced into the applicator. The hydrogen may optionally be introduced into the applicator under pressure or the applicator may be optionally pressurized after the introduction of hydrogen. The pressure in the applicator after the introduction of hydrogen is generally maintained at about 1 kilogram per square centimeter (kg/cm$^2$) to about 100 kg/cm$^2$. Within this range a pressure of greater than or equal to about 5, preferably greater than or equal to about 7, and more preferably greater than or equal to about 10 kg/cm$^2$ is usable. Also desirable within this range is a pressure of less than or equal to about 95, preferably less than or equal to about 75, and more preferably less than or equal to about 50 kg/cm$^2$. The preferred value of pressure in the applicator is about 30 kg/cm$^2$.

The hydrogen may be introduced into the applicator with other non-reactive gases in order to facilitate the storage process. Such a combination of hydrogen with other gases is referred to as a gaseous mixture. Preferred non-reactive gases are the inert gases. When other gases are introduced along with the hydrogen, the hydrogen content is generally about 50 to about 99 weight percent (wt %) based on the total weight of the gaseous mixture.

The radio frequency radiation or the microwave radiation, can be applied to the applicator in the form of a continuous wave or in the form of a pulsed wave. The hydrogen storage composition may also be agitated during the storage process to obtain a uniform storage of hydrogen into the composition. Since the storage of hydrogen is in general an exothermic reaction, during the storage of hydrogen, the applicator may be cooled with water, liquid nitrogen, liquid carbon dioxide or air if desired.

During the recovery of hydrogen, heat may be supplied to the hydrogen storage composition to generate hydrogen. The radio frequency radiation and the microwave radiation may therefore be applied to heat the hydrogen storage composition. The heating of the composition may be accomplished by a combination of convectional heating and radio frequency radiation and/or microwave frequency radiation. During the recovery of hydrogen, the pressure in the applicator may be optionally lowered. The pressure in the applicator during the recovery of hydrogen is about 1 to about 300 millimeters of mercury (mm of Hg). Within this range, a pressure of greater than or equal to about 5, preferably greater than or equal to about 7, and more preferably greater than or equal to about 10 mm of Hg is usable. Also desirable is a pressure of less than or equal to about 250, preferably less than or equal to about 200, and more preferably less than or equal to about 100 mm of Hg. The preferred value of the pressure in the applicator is about 20 mm of Hg.

In one exemplary method of producing and storing hydrogen by using radio frequency waves (radio waves) and/or microwaves with hydrogen storage compositions, a system shown in the FIGURE comprises an optional hydrogen storage composition reactor (a first applicator at a first location) upstream of and in fluid communication with a hydrogen generation reactor (a second applicator at a second location). As noted above, if desired, the first applicator may be different from the second applicator and the first location may be different from the second location. In another embodiment, the first applicator may be the same as the second applicator and the first location may be the same as the second location. The hydrogen storage composition reactor uses radio waves and/or microwaves to regenerate a hydrogen storage composition that is utilized to produce hydrogen in the hydrogen generation reactor. The hydrogen storage composition may be in the form of a slurry if desired.

At least a portion of the hydrogen storage composition in the hydrogen generation reactor is utilized for the recovery of hydrogen from the hydrogen storage compositions. When a hydrogen storage composition has released its hydrogen it is termed a spent hydrogen storage composition. The hydrogen generation reactor utilizes radio waves and/or microwaves to generate the hydrogen. The hydrogen generation reactor may also use convectional heating, conductional heating, PEM fuel cell exhaust, and the like, in addition to microwaves and radio waves to heat the hydrogen storage composition for purposes of hydrogen generation. The hydrogen generation reactor is also upstream of and in fluid communication with an optional drying and separation reactor and the spent hydrogen storage composition may be optionally transferred to the drying and separation reactor. At least a portion of spent hydrogen storage composition generated in the hydrogen generation reactor is optionally recycled to the drying and separation reactor. The hydrogen generation reactor is optionally supplied with water. The optional drying and separation reactor separates any reusable fluids such as water from the spent hydrogen storage composition and recycles the fluid to the optional hydrogen storage composition reactor. The hydrogen storage composition is then recycled to the hydrogen storage composition reactor for mixing with the recycled carrier liquids and for regeneration. Besides hydrogen storage compositions, other materials such as carbon, alanates, and the like may be used to generate hydrogen in the hydrogen generation reactor.

This method of hydrogen storage and generation advantageously may be used for on board generation of hydrogen in fuel cells placed on small vehicles such as automobiles having a weight of up to about 2,500 kilograms. This method of hydrogen storage and generation may also be advantageously used in a land mobile such as an automobile, a train, and the like; a water craft such as a barge, ship, submarine, and the like; or an airborne carder or a space ship such as an airplane, rocket, space station, and the like, It may also be used for the generation of hydrogen in fuel cells used for power generation used for residential applications, factories, office buildings, and the like.

EXAMPLE

This example was undertaken to demonstrate the ability of microwave radiation to generate hydrogen from a hydrogen storage composition comprising alanates. In this example, a first vial containing sodium alanate and a sensor having platinum disposed over a mixture of tungsten oxide and vanadium oxide ($WO_3$ and $V_2O_5$), a second vial containing only the sensor, and a third vial containing only the sodium alanate were subjected to microwave radiation having a frequency of 2.45 GHz and a power of 700 watts. While hydrogen was sensed in the first vial after 3 minutes at a temperature of 80° C., the second vial and the third vial did not show any presence of hydrogen.

This example demonstrates the ability of using microwaves to facilitate the recovery of hydrogen from a hydrogen storage composition.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method for the storage of hydrogen comprising:
   contacting a hydrogen storage composition with a gaseous mixture comprising hydrogen; and
   irradiating the hydrogen storage composition with radio frequency radiation or microwave radiation in an amount effective to facilitate the absorption, adsorption or chemisorption of hydrogen into the hydrogen storage composition.

2. The method of claim 1, wherein the contacting is conducted at a pressure of about 1 to about 100 kilogram per square centimeter.

3. The method of claim 1, wherein the irradiating is conducted at about 10 kilohertz to about 300 megahertz.

4. The method of claim 1, wherein the irradiating is conducted at about 300 megahertz to about 300 gigahertz.

5. The method of claim 1, wherein the irradiating imparts to the hydrogen storage composition an energy of about 0.001 watt/gram to about 1.000 watts/grain.

6. The method of claim 1, wherein the gaseous mixture comprises about 50 to about 99 weight percent hydrogen.

7. The method of claim 1, wherein the gaseous mixture consists of hydrogen.

8. A method for the storage and recovery of hydrogen comprising:
   contacting a hydrogen storage composition with a first gaseous mixture comprising a first concentration of hydrogen;
   irradiating the hydrogen storage composition with a radio frequency radiation or microwave radiation having a first frequency in an amount effective to facilitate the absorption, adsorption and/or chemisorption of hydrogen into the hydrogen storage composition;
   contacting the hydrogen storage composition with a second gaseous mixture comprising a second concentration of hydrogen; and
   irradiating the hydrogen storage composition with a radio frequency radiation or microwave radiation having a second frequency in an amount effective to facilitate the desorption of hydrogen from the hydrogen storage composition.

9. The method of claim 8, wherein the first concentration of hydrogen is greater than the second concentration.

10. The method of claim 8, wherein the first frequency is not equal to the second frequency.

11. The method of claim 8, wherein the first frequency is equal to the second frequency.

12. The method of claim 8, wherein the contacting a hydrogen storage composition in a gaseous mixture comprising a first concentration of hydrogen is conducted at a first location, and wherein the contacting the hydrogen storage composition in an environment comprising a second concentration of hydrogen is conducted at a second location.

13. The method of claim 12, wherein the first location is not the same as the second location.

14. The method of claim 12, wherein the first location is the same as the second location.

15. The method of claim 8, wherein the first gaseous mixture consists of hydrogen.

16. The method of claim 8, wherein the contacting a hydrogen storage composition in a gaseous mixture comprising a first concentration of hydrogen is conducted at a pressure of about 1 to about 100 kilogram per square centimeter.

17. The method of claim 8, wherein the contacting a hydrogen storage composition in a gaseous mixture comprising a second concentration of hydrogen is conducted at a pressure of about 1 to about 300 millimeters of mercury.

18. The method of claim 8, wherein the irradiating is conducted at about 10 kilohertz to about 300 megahertz.

19. The method of claim 8, wherein the irradiating is conducted at about 300 megahertz to about 300 gigahertz.

20. The method of claim 8, wherein the irradiating imparts to the hydrogen storage composition an energy of about 0.001 watt/gram to about 1,000 watts/gram.

21. The method of claim 8, wherein the hydrogen storage composition comprises carbon, aluminides, alanates, carbides, borides, nitrides, borocarbides, boronitrides, silicides, borosilicides, carbosilicides, or nitrosilicides.

22. The method of claim 21, wherein the carbon comprises single wall carbon nanotubes, multiwall carbon nanotubes and vapor grown carbon nanofibers.

23. An energy generating system utilizing the method of claim 8.

24. A land mobile, water craft, an airborne carrier, a space craft or a space vehicle comprising the energy generating system of claim 23.

25. A system for the storage and recovery of hydrogen comprising:
   a hydrogen generation reactor, wherein the hydrogen generation reactor utilizes radio frequency radiation and/or microwave frequency radiation to recover hydrogen.

26. The system of claim 25, wherein the hydrogen generation reactor is in fluid communication with and down stream of a hydrogen storage composition reactor.

27. The system of claim 26, wherein the hydrogen storage composition reactor is in fluid communication with and downstream of a drying and separation reactor.

28. The system of claim 25, wherein the hydrogen generation reactor is in fluid communication with and up stream or a hydrogen storage composition reactor and further wherein the hydrogen storage composition reactor utilizes radio frequency radiation and/or microwave frequency radiation to store hydrogen.

29. The system of claim 25, wherein the hydrogen generation reactor is in fluid communication with and up stream of a drying and separation reactor and further wherein the hydrogen storage composition reactor utilizes radio frequency radiation and/or microwave frequency radiation to store hydrogen.

30. The system of claim 25, wherein a hydrogen storage composition slurry is transferred to the hydrogen generation reactor from a hydrogen storage composition reactor.

31. The system of claim 25, wherein water is introduced into the hydrogen generation reactor.

32. The system of claim 25, wherein hydrogen is generated in the hydrogen generation reactor by the further use of heat from convective heat and/or conductive heat.

33. The system of claim 32, wherein the convective heat and/or conductive heat comprises fuel exhaust from a PEM cell.

34. The system of claim 25, further comprising infrared and X-rays to facilitate the recovery of hydrogen.

* * * * *